United States Patent [19]

Noguchi et al.

[11] Patent Number: 4,744,660
[45] Date of Patent: May 17, 1988

[54] APPARATUS FOR MEASURING DIFFERENCE IN SHALLOW LEVEL

[75] Inventors: Minori Noguchi, Yokohama; Toru Otsubo, Fujisawa; Susumu Aiuchi, Yokohama, all of Japan

[73] Assignee: Hitachi, Ltd., Tokyo, Japan

[21] Appl. No.: 850,683

[22] Filed: Apr. 11, 1986

[30] Foreign Application Priority Data

Apr. 12, 1985 [JP] Japan .................. 60-76391

[51] Int. Cl.$^4$ .............................................. G01B 9/02
[52] U.S. Cl. ..................................... 356/355; 350/509
[58] Field of Search ....................... 356/357, 355, 381; 350/525, 509

[56] References Cited

U.S. PATENT DOCUMENTS 4,030,835 6/1977 Firester et al. .................... 356/357
4,630,926 12/1986 Tanaka et al. .................... 356/357

FOREIGN PATENT DOCUMENTS 54-17872 2/1979 Japan .

OTHER PUBLICATIONS

Roach et al., "Diffraction Spectrometry for Video Disc Quality Control" 9/1978, pp. 504–505.
Carter, "Measurement of Second-Order Coherence in a Light Beam Using a Microscope and a Grating", 3/1977, p. 558.
McCarthy et al., "Infrared Spatial Interferometry: Present Status and Future Plans", 1979, pp. 140 & 141.
Kleinknecht, "Optical Monitoring of the Etching of $SiO_2$ and $Si_3N_4$ on Si by the use of Grating Test Patterns", 5/1973.

*Primary Examiner*—Davis L. Willis
*Assistant Examiner*—Matthew W. Koren
*Attorney, Agent, or Firm*—Antonelli, Terry & Wands

[57] ABSTRACT

An apparatus for measuring a difference in level in a sample comprises a light source section which provides illumination light of a variable-wavelength. The illumination light is irradiated onto the sample. A group of filters is provided for shielding diffraction light rays of 0-order or other than 0-order of the light reflected from the sample. The intensity of interference light of the light rays not shielded by the filter group is detected by a light detector which in turn converts it into an electric signal. An arithmetic operation unit receives the electric signal while the wavelength of the illumination light from the light source section is continuously varied. In the arithmetic unit, wavelengths at which the electric signal or detected light intensity takes extreme values are determined, and the level difference in the sample is determined on the basis of those wavelengths.

17 Claims, 5 Drawing Sheets

APPARATUS FOR MEASURING DIFFERENCE IN SHALLOW LEVEL

BACKGROUND OF THE INVENTION

The present invention relates to an apparatus for measuring a difference in level at a minutely rugged or stepped portion formed on a sample (more particularly, a level difference on the surface of a semiconductor device), by using an optical technique in a broad sense including not only visible light but also infrared and ultraviolet rays (more particularly by using an optical interference system).

Semiconductor devices are now being changed into three-dimensional configurations from two-dimensional configurations to achieve high integration. Under the circumstances, a technique is required for forming a hole with its depth about 3 to 5 $\mu$m or a groove with its width about 1 to 2 $\mu$m in a silicon substrate by suitable processes such as etching. For the development of such processes and the management of processing, a non-contact method for measuring the depth (level difference) of a processed groove is necessary. However, with the conventional technique, it was difficult to achieve the non-contact level difference measurement.

One analogous technique is a method utilizing an optical interference method as a means for measuring the depth of a rugged pattern of such as a video disc (see JP-A-54-17872). In this method, the pattern depth is measured in non-contact manner while changing the wavelength of an incident light. However, since this method is directed to the measurement of an average depth of a three-dimensional pattern, it is not suitable for measurement of the depth of a single hole positioned at a specific region (in the order of 0.2 to 3000 $\mu$m$^2$). The reason is because an optical system for illuminating only such a single hole or an optical system for detecting light from only the single hole is not provided.

As an apparatus having an image-forming or imaging optical system utilizing interference and diffraction of light, there is known a phase-contrast microscope whose principle is disclosed in various documents (e.g. Hiroshi Kubota, "Wave Optics", pp. 418–422 published by Iwanami Shoten, and H. P. Kleinknecht et al, "Optical Monitoring of the Etching of SiO$_2$ and Si$_3$N$_4$ on Si by the Use of Grating Test Patterns", J. Electrochem. Soc., Solid-State Science and Technology, Vol. 125, No. 5, pp. 798–803, May 1973).

The phase-contrast microscope can only observe clear contours of objects with phase difference by utilization of the phase difference but cannot quantatively obtain the phase difference or level difference between the objects. In other words, it cannot measure the depth of hole or groove.

SUMMARY OF THE INVENTION

It is an object of the present invention to provide a level difference measuring apparatus capable of performing a non-contact measurement of a level difference at a desired specific position of a sample processed, by detecting a change in light intensity at the specific position due to interference.

A feature of the present invention resides in the use of an imaging optical system and a spatial filter. The measuring apparatus of the invention comprises a light source of variable wavelength, light detecting means, arithmetic operation means, means for shielding 0-order diffraction light or diffraction light other than 0-order diffraction light to cause diffraction, and a spatial filter for receiving only light from a specific measuring position.

The imaging optical system is used for detecting a change in light intensity caused by interference at the specific position. In a phase-contrast microscope, clearly observable contours of phase-contrasted objects are obtained by the interference of lights from the respective phase-contrasted objects. Taking this fact into consideration, an optical arrangement of eliminating 0-order diffraction light or diffraction light other than 0-order diffraction light is used in the present invention as a similar substitution for the phase-contrast microscope, in order to cause interference in the imaging optical system. An arrangement of causing a change in intensity of interference light is realized with the provision of a mechanism for continuously changing the wavelength of monochromatic light used as illumination light.

DESCRIPTION OF THE PREFERRED EMBODIMENTS

Prior to description of embodiments of the present invention, the fact that clearly observable contours of phase-contrasted objects are obtained in a phase-contrast microscope by the interference of lights from the respective phase-contrasted objects will be explained with reference to FIG. 4.

Figure 4:
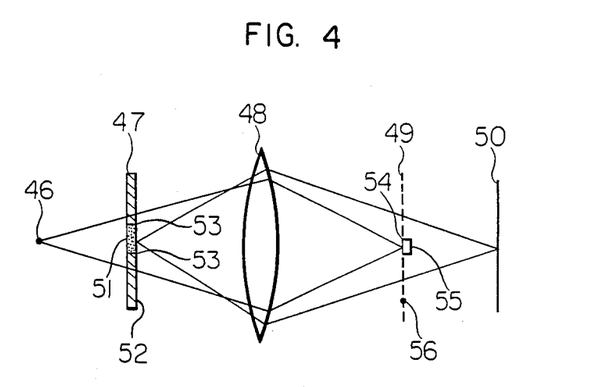
FIG. 4 is an optical diagram for explaining the principle of converting a phase difference into dark and bright waves.

FIG. 4 shows a Schlieren optical system which is a basic construction of a phase-contrast microscope. A Fraunhofer diffraction image of a transparent object 47 is formed by a lens 48 on a diffraction image plane 49. That is, a geometric image of a point light source 46 is focused on a point 54. In addition, a geometric image of the object 47 is focused by the lens 48 on a focal plane 50.

The object 47 is here assumed to be constructed of two transparent objects 51 and 52 having a phase difference $\phi$ therebetween.

According to the Babinet's principle, "diffraction images in a Fraunhofer region of the complementary patterns (patterns with their white and black inversed) have the same light intensity and a phase difference $\pi$ except a middle one point (0-order diffraction image)"

(see "Optics II", Series of Physics published by Misuzu Shobho). Therefore, the objects 51 and 52 of FIG. 4 can be considered as complementary patterns according to the Babinet's principle.

Now consider any one point 56 other than the 0-order diffraction image position 54 on the diffraction image plane 49. It is reasonable to think that diffraction light $\phi_1$ and $\phi_2$ of the objects 51 and 52 reach the point 56. The two diffraction lights are defined by the following equation (1) according to the Babinet's principle:

$$\left. \begin{array}{l} \phi_1 = Ae^{-i\omega t} \\ \phi_2 = Ae^{-i(\omega t + \phi + \pi)} \end{array} \right\} \quad (1)$$

$$\omega: 2\pi \frac{C}{\lambda}$$

wherein A represents an amplitude, C a velocity of light, and $\lambda$ a wavelength.

The light source 46 is assumed to be a point source and to provide light of the same wavelength. Namely, the light from the light source 46 is coherent so that at the point 56, the two diffraction lights $\phi_1$ and $\phi_2$ are added together with their phases and observed as an interference light. The intensity of the interference light is given by the following equation (2):

$$\begin{aligned} I &= |Ae^{-i\omega t} + Ae^{-i(\omega t + \phi + \pi)}|^2 \\ &= A^2(1 - \cos\phi) \end{aligned} \quad (2)$$

In the case of $\rho = 0$, I is equal to 0. $\rho = 0$ means that the objects 51 and 52 are considered as a single continuous object in terms of phase distribution. I=0 means that no diffraction occurs. In the case of $\rho = \pm \pi$, on the other hand, I takes the maximum value, which means that the most efficient diffraction occurs.

Thus, a phase difference between the two objects 51 and 52 can be determined on the basis of the equation (2) by observing the intensity of light reaching the focal plane 50 while eliminating 0-order diffraction light by a shield plate 55.

Even in the case of eliminating the 0-order diffraction light, a geometric image of the object is formed on the focal plane 50. However, the elimination of 0-order diffraction light results in that only a border line 53 between the objects 51 and 52 is visualized brighter since light not undergoing influence of diffraction by the border line 53 is intercepted by the shield plate 55 and cannot reach the focal plane 50.

This phenomenon is similar to the phenomenon in a phase-contrast microscope in which the contours of phase-contrasted objects can be clearly observed.

Therefore, by selecting an image (contour) focused on the focal plane 50, it is possible to select two desired objects whose phase difference is to be determined.

In the above description, it has been explained that clearly observable contours of objects are obtained by the interference of lights from the respective objects. It is particularly emphasized that the interference phenomenon according to the equation (2) occurs when 0-order diffraction light is shielded. The interference phenomenon can also be observed by shielding diffraction light other than 0-order diffraction light or by detecting only the 0-order diffraction light, since the overall intensity of reflected light is always constant. However, according to the Babinet's principle that the light intensity becomes equal for diffraction light other than 0-order diffraction light, the contrast in change of interference intensity becomes greater if the 0-order diffraction light is shielded.

An embodiment of the present invention will now be described with reference to FIGS. 1, 5, 6 and 7.

Figure 1:
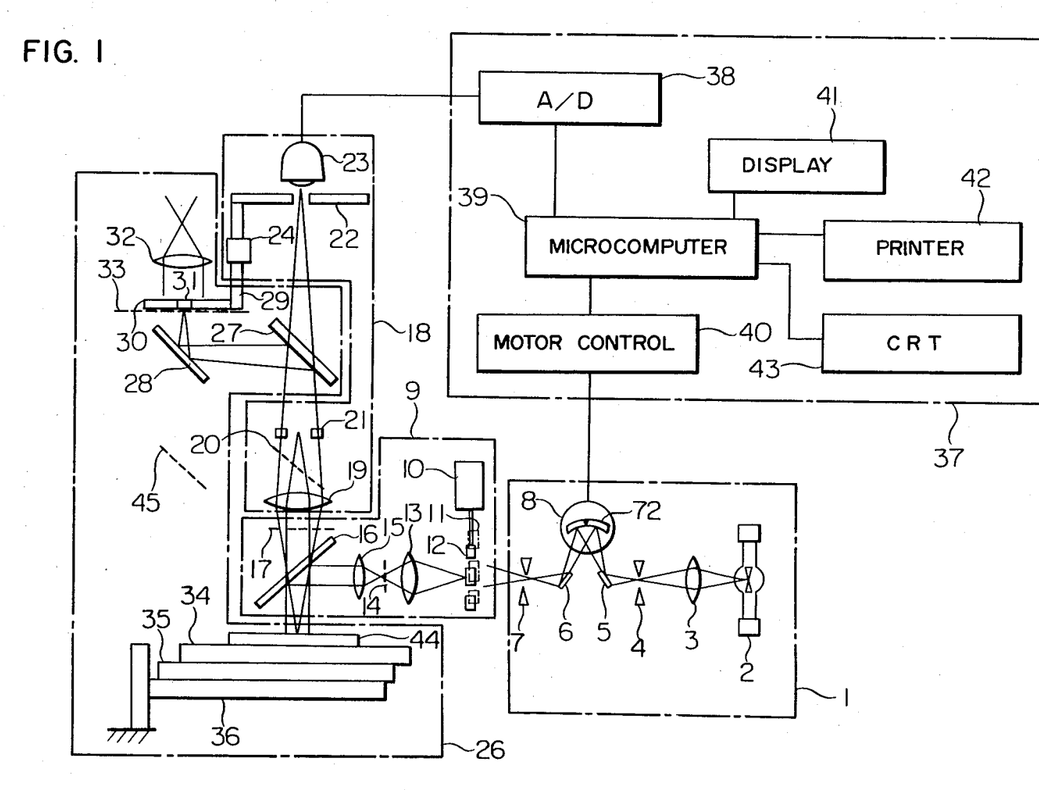
FIG. 1 shows in block diagram the overall construction of a level difference measuring apparatus according to an embodiment of the present invention.

FIG. 1 shows a level difference measuring apparatus according to an embodiment of the present invention. The apparatus comprises a light source section 1 including light source 2, lens 3, slits 4 and 7, mirrors 5 and 6, concave diffraction grating 72 and motor 8. A light illumination section 9 includes spatial filter 12, spatial filter motion adjustment device 10, lenses 13 and 15, and half-mirror 16. A light detection section 18 includes lens 19, spatial filters 21 and 22, spatial filter motion adjustment device 24 and light detector 23. A sample observation/measurement position determination section 26 includes half-mirror 27, mirror 28, graduated plates 30, coupling jig 29, and eyepiece 32 and a table having X, Y and Z stages 34, 35 and 36. A control/arithmetic operation/output section 37 includes A/D converters 38, motor control system 40, CRT 43, microcomputer 39, printer 42 and seven-segment display 41.

In the light source section 1, light from the light source 2 is condensed by the lens 3 on the slit 4. To improve light condensation efficiency, a high-brightness xenon lamp is preferably as the light source 2.

Light applied to a concave surface of the concave diffraction grating 72 via the slit 4 and mirror 5 is condensed on the slit 7 via the mirror 6. In this case, light undergoes diffraction by the concave diffraction grating 72. The 1-order diffraction light has a different diffraction angle depending on its wavelength, so that a particular diffraction light can be obtained with the aid of the slit 7. Also, by rotating the concave diffraction grating 72 by means of the motor 8, it is possible to select a desired wavelength.

In the light illumination section 9, light after passing through the spatial filter 12 is applied to the surface of a sample 44 via the lenses 13 and 15 and half-mirror 16. Suppose that the surface of the sample 44 forms a mirror, the real image of the spatial filter 12 is focused on the spatial filter 21 by way of the lenses 13, 15 and 19. In order that the 0-order diffraction light from the surface of the sample 44 does not reach the spatial filter 22, the configurations of the spatial filters 12 and 21 are made complementary.

It is preferable that the configuration of the spatial filter 12 is of annular diaphragm, as is shown in various documents (e.g. Hiroshi Kubota "Wave Optics" by published by Iwanami Shoten). The effect of use of the annular diaphragm as a light source in a phase-contrast microscope is discussed in those documents. In particular, without use of an ideal point light source it is difficult to shield the 0-order diffraction light. However, with use of the annular diaphragm, it is possible to effectively shield the 0-order diffraction light.

Several documents (e.g. Hiroshi Kubota, "Wave Optics" published by Iwanami Shoten) discloses a multi-pupil phase-contrast microscope. According to the teaching of this method, the spatial filter 21 is disposed at a position apart from the lens 19, which facilitates exchange of the spatial filter 21. This can be realized by arranging an auxiliary lens outside of the lens 19. The present invention may also use such an optical arrangement of the multi-pupil phase-contrast microscope.

The spatial filter 12 may be omitted. In this case, illumination light is collimated to approximately parallel light beams and the spatial filter 21 is made circular. In that case, the spatial filter 21 may be placed at a position 17 (shown by dotted line) in front of the lens 19 to shield 0-order diffraction light.

A variable-wavelength dye laser in the range of 300 to 800 nm may be used as the light source. In the dye laser, it is possible to continuously vary the wavelength by changing the angle of a diffraction grating used as a resonance mirror. In practice, a usable laser may be He-Cd laser, $N_2$ laser, Ar laser, YAG laser, or dye laser using the 2nd harmonics of any one of the above-mentioned lasers as an excitation source. These dye lasers may become light sources superior to the above-mentioned light source if proper dyes are selected. In other words, such a light source is coherent and strong in terms of time and space.

The use of a dye laser enables improvement of the light detection efficiency. In this case, the spatial filter 12 and lenses 13 and 15 may be omitted and the shape of the spatial filter 21 is approximated to the Fraunhofer diffraction image of a collimated light (i.e. a point). More especially, the spatial filter 21 becomes a disk having a diameter of about 0.05 to 0.5 mm which is defined by the beam divergence angle. The spatial filters 21 may of course be positioned at 17.

It is convenient to prepare several lenses for exchange with the lens 19 in order to cover a magnification range from a small one to a large one as required. Upon exchanged the lens 19, it is necessary to change also the position and dimension of the spatial filter 21. Thus, it is desirable to replace both the lens 19 and the spatial filter 21 in a unitary form.

In the light detection section 18, a geometric image of the sample 44 is focused by the lens 19 on the spatial filter 22. An image selected by the spatial filter 22 is received by the light detector 23.

Figure 3:
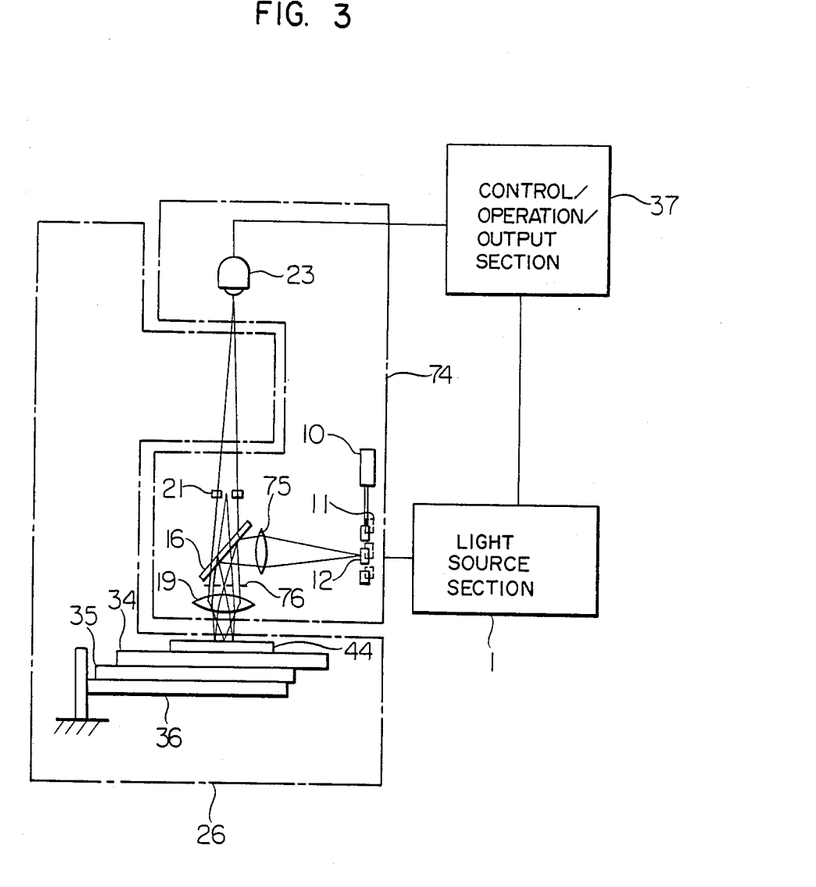

The light illumination section 9 and light detection section 18 may take another arrangement which is generally designated by reference numeral 74 in FIG. 3. In the light illumination/detection section 74 of FIG. 3, a real image of the spatial filter 12 is focused by a lens 75 on a focal plane 76. This image passes through a lens 19 and reflected by the sample 44, and again passes the lens 19 and focused on the spatial filter 21. In particular, this is achieved by forming the focal plane 76 in front of the rear focal point of the lens 19. With this arrangement, it is not necessary to mount the half-mirror 16 between the lens 19 and the sample 44, which avoids the use of a large working-distance lens as the lens 19. Further, it is possible to mount the half-mirror 16 outside of the spatial filter 21. Of course, a dye laser can be used in the light source section 1.

Returning to FIG. 1, in the sample observation/measurement position determination unit 26, a virtual image of the sample 44 is formed by way of the lens 19, half-mirror 27 and eyepiece 32.

The graduated plate 30 interlocking with the spatial filter 22 via the coupling jig 29 is placed on a real image plane 33. To identify the image selected by the spatial filter 22, a mark 31 of the same shape as the spatial filter 22 is formed on the graduated plate 30.

In determining the position of image observation and measurement, the spatial filter 12 (in the light illumination section 9) is moved to the position 11 in order to make a virtual image bright. That is, the real image of the spatial filter 12 is shifted from the position of the spatial filter 21 so that stronger light reaches the eyepiece 32.

Alternatively, it is possible to always focus a bright virtual image without moving the spatial filter 12, by mounting the half-mirror 27 at a position 20 (shown by dotted line) between the spatial filter 21 and lens 19 and mounting the mirror 28 at a position 45 (shown by dotted line).

In the control/arithmetic operation/output section 37, a signal from the light detector 23 is received while changing the wavelength of illumination light by driving the motor 8 in the light source section 1. The received signal is converted into a digital signal by the A/D converter 38 and thereafter subjected to processing in the microcomputer 39. The result of processing is outputted on the printer 42, CRT 43 and/or seven-segment display 41.

Figure 5:
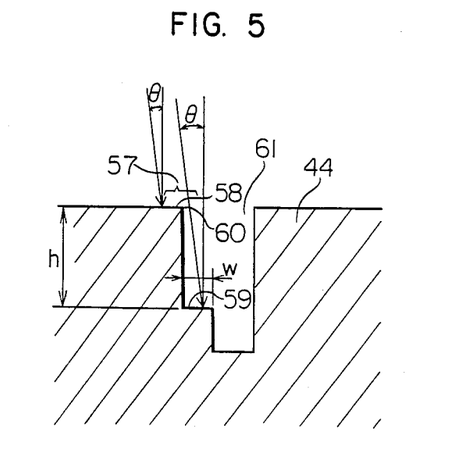
FIG. 5 is a view showing a positional relation between a typical configuration of a sample to be measured and incident light.

Now, a measurement operation will be described in conjunction with the case where it is desired to measure a level difference h of the sample 44 having a cross-sectional structure as shown in FIG. 5. The range 57 of measurement of the sample is here assumed to have a diameter of about 2 $\mu$m and the level difference h of about 10 $\mu$m.

The sample 44 is mounted and illuminated with light having a suitable wavelength (e.g. about 500 nm highly sensitive to the human eyes).

The spatial filter 12 is moved to a position 11 (shown by dotted lines) so that the sample 44 is observed through the eyepiece 32. An in-focus is achieved by adjusting the Z stage 36 while the measuring area is moved into a field of view by means of the X and Y stages 34 and 35.

Next, the graduated plate 30 is moved in interlocking relation with the spatial filter 22 so that the measuring area comes within the mark 31 of the graduated plate 30. In this case, it is required that an undesired measuring area should not come into the mark 31. If this requirement is not satisfied, it is necessary to replace the lens 19 and the spatial filter 22 with a combination having a proper magnification factor. For the exemplified case, it is suitable to use the lens 19 with its magnification of about 100 and the spatial filter 22 with its aperture diameter of about 0.22 mm, though there is not limited to these values so long as the measuring area can be properly set.

Then, the spatial filter 12 is moved to the original position for fine adjustment of position or for the purpose of efficiently shielding 0-order diffraction light. More particularly, while observing through the eyepiece 32, the spatial filter 12 is fixed at a position where the image becomes darkest.

In this manner, a position for image measurement has been set.

Light illuminated on the sample 44 is reflected at surfaces 58 and 59 (FIG. 5) and reaches the spatial filter 21 by way of the lens 19. 0-order diffraction light is shielded by the spatial filter 21 and only diffraction light reaches the spatial filter 22.

In the case of the sample 44 of FIG. 5, the surfaces 58 and 59 constitute complementary objects which follow the Babinet's principle. More particularly, an edge 60 corresponding to the above-described contours of phase-contrasted objects can be clearly observed and the light intensity at this bright portion is given by the equation (2).

The phase difference $\rho$ in the equation (2) corresponds to a difference in phase between lights reflected at the surfaces 58 and 59, which phase difference is given by the following equation (3):

$$\phi = 2\pi \frac{2hn}{\lambda} \quad (3)$$

wherein h represents a level difference between the surfaces 58 and 59, n a refractive index of a medium 61 (which may be typically air), and $\lambda$ the wavelength of illumination light.

Accordingly, the light intensity being detected changes in accordance with the following equation:

$$I = I_o \left[ 1 - \cos\left(\frac{4\pi nh}{\lambda}\right) \right] \quad (4)$$

In measuring the level difference of the sample 44 shown in FIG. 5, a ratio of the width w of the surface 50 to the level difference h (or an aspect ratio) must be taken into consideration. That is, it is required that incident light has a sufficiently acute angle with respect to the aspect ratio. Thus, it is necessary to satisfy the following relation:

$$\tan \theta \lesssim w/h \quad (5)$$

wherein $\theta$ represents an incident angle or a divergence angle of illumination light.

Therefore, to broaden the available range of measurement, it is desirable to make the divergence angle of illumination light as small as possible. To this end, in the present embodiment, the lenses 13 and 14 are used to produce well or narrowly defined and approximately collimated light flux. That is, the lens 13 is used to focus the real image the spatial filter 12 in a reduced scale on the image plane 14 and the lens 15 is used to apply the image onto the sample 44 in the form of approximately collinated light flux. Such an optical arrangement is employed in some phase-contrast microscopes (e.g. Hiroshi Kubota, "Wave Optics" published by Iwanami Shoten).

Figure 6:
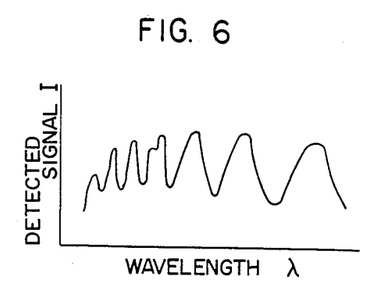
FIG. 6 shows a change in detection signal when the wavelength of illumination light is varied.

Next, while changing the wavelength of illumination light in the range of 250 to 700 nm, the signal from the light detector 23 is received. The received light is converted into an electric signal by the light detector 23 and the signal is subjected to A/D conversion in the A/D converter 38 after being amplified. Thereafter, the microcomputer 39 performs processing of signal. An example of the waveform of the received signal is shown in FIG. 6.

At a first stage of the signal processing, spectroscopic characteristics of the optical system such as the light source 21, lens system, concave diffraction grating 72 are compensated. This compensation can be achieved by dividing a measured signal I by the spectroscopic characteristics Is of the optical system which are previously measured and stored in a memory of the microcomputer 39.

Figure 7:
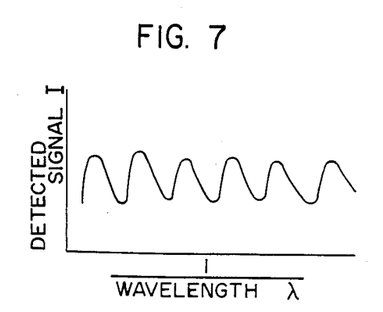
FIG. 7 shows a change in detection signal after $\lambda - 1/\lambda$ conversion associated with the abscissa of FIG. 6.

Next, $\lambda - 1/\lambda$ conversion is performed as a preparator procedure for determining wavelengths at which the change of interference intensity takes the maximum and minimum values. Namely, the signal I received for $\lambda$ is rearranged for $1/\lambda$. As a result, a periodical function having its period changing with the wavelength is converted into a periodical function having the same period irrespective of the wavelength, as shown in FIG. 7.

By virtue of such conversion, it is possible to detect the maximum and minimum points by means of a differentiation or point matching method.

The signal after $\lambda - 1/\lambda$ conversion is subjected to a smoothing process in which several adjacent points are averaged. Thereafter, wavelengths $\lambda$ which provide the maximum and minimum points are determined by the point matching method. These wavelengths are represented in the order of small values by $\lambda_1, \lambda_2, \ldots, \lambda_j, -\lambda_n$.

From the equation (4), it is apparent that the maximum value is provided in the case of the following equation (6) while the minimum value is provided in the case of the following equation (7):

$$\left. \begin{array}{l} 2nh = (i + \tfrac{1}{2}) \lambda_{2j+1} \\ 2nh = (i - m + \tfrac{1}{2}) \lambda_{2(j+m)+1} \end{array} \right\} \quad (6)$$

$$\left. \begin{array}{l} 2nh = i \cdot \lambda_{2j} \\ 2nh = (i - m) \lambda_{2(j+m)} \end{array} \right\} \quad (7)$$

By substituting the equations (6) and (7) into each other to remove i therefrom, the level difference h can be determined from the wavelength as follows:

$$h = \frac{m \cdot \lambda_{j+m} \cdot \lambda_j}{4n(\lambda_{j+m} - \lambda_j)} \quad (8)$$

Alternatively, the level difference h may be determined by frequency-analyzing the waveform after $\lambda - 1/\lambda$ conversion shown in FIG. 7. In particular, the distance l between the peak values of the periodical waveform I is obtained either by fast Fourier transformation (FFT) or maximum entropy method (MEM). Since $$l = \frac{1}{\lambda_j} - \frac{1}{\lambda_{j+2}} \quad (9)$$

the level difference h can be obtained by the following equation (10):

$$h = \frac{1}{2n} \cdot \frac{\lambda_{j+2} \cdot \lambda_j}{\lambda_j - \lambda_{j+2}} = \frac{1}{2nl} \quad (10)$$

As is apparent from the above equations, at least two maximum and minimum points are sufficient. Therefore, the wavelength range of illumination light is not limited to the range of 250 to 700 nm, but a narrower range may be used.

Figure 2:
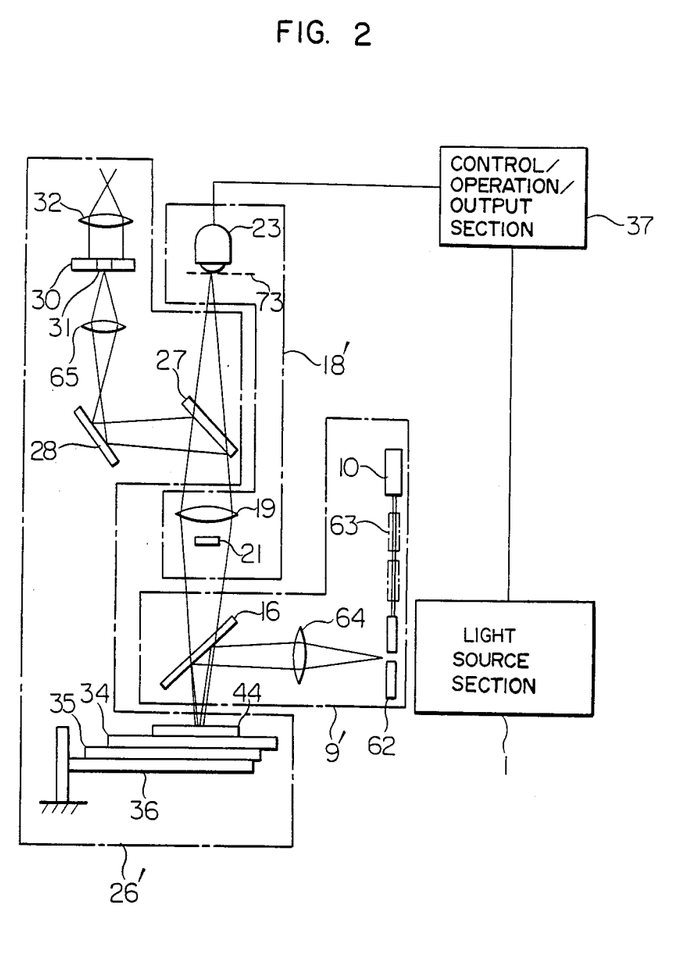
FIGS. 2 and 3 show in block diagram the overall constructions of level difference measuring apparatusses according to other embodiments of the present invention.

FIG. 2 shows a level difference measuring apparatus according to another embodiment of the present invention.

This embodiment has a common feature as that of the previous embodiment in that interference of light is used by shielding 0-order diffraction light and that an imaging optical system is used for measurement of a specific area of the sample.

The apparatus of this embodiment comprises the light source section 1 and control/arithmetic operation/output section 37 of the same construction as of the previous embodiment. A light illumination section 9' is constructed of spatial filter motion unit 10, lens 64 and half-mirror 16. A light detection section 18' is constructed of spatial filter 21, lens 19 and light detector 23.

A sample observation/measurement position determination section 26' is constructed of half-mirror 27, mirror 28, graduated plate 30, lens 65, eyepiece 32, and X, Y and Z stages 34, 35 and 36.

In the light illumination section 9', a real image of the spatial filter 62 is focused by the lens 64 on the surface of the sample 44 via the half-mirror 16. By properly setting the aperture diameter of the spatial filter 62, the range of measurement is determined. To apply light on the surface of the sample with an acute angle, it is necessary to darken the lens 64 than about 4.0 in terms of F value.

In the light detection section 18', a real image of the sample 44 is focused on a detection plane 73 by the lens 19 to detect light with the light detector 23. This optical system is sufficient only if it achieves the purpose of condensing light, so that an imaging optical system is not always necessary. 0-order diffraction light is shielded by the spatial filter 21. More in particular, the dimension of the spatial filter 21 is so set as to shield only reflected and diverged light when a mirror is placed at the position of the sample 44. The lens 19 is fixed beforehand in such a way that light detection with the light detector 23 is efficiently performed when the sample 44 is placed at a position where the image on the spatial filter 62 is focused on the surface of the sample 44.

In the sample observation/measurement position determination section 26', a vertical image of the sample 44 is observed via the half-mirror 27 and mirror 28 and via the lens 65 and eyepiece 32. The graduated plate 30 is provided with a mark 31 whose dimension defines a closed area indicative of the range of measurement, and fixed at a predetermined position.

In the case where the spatial filter 62 is replaced and the range magnification of measurement is changed, the lens 65 is replaced with a new one in accordance with the magnification factor, to thereby make the measurement area come correctly within the mark 31. In addition, the optical system is fixed in such a way that virtual image is correctly observed when the sample is placed at the position where the image on the spatial filter 62 is focused on the surface of the sample 44.

Next, the operation of the apparatus of FIG. 2 will be described.

The operations of the light source section 1 and control/arithmetic operation/output section 37 are the same as those with the previous embodiment.

After a sample is placed and light of a suitable wavelength is illuminated, the spatial filter 62 is moved to a position 63 (shown by dotted lines) to observe the sample with the eyepiece 32. Next, a focus is adjusted by moving the Z stage 36 and thereafter, the X and Y stages 34 and 35 are moved to make the measurement area come within the mark 31 of the graduated plate 30. The latter operation is conducted as occasions arise simultaneously with the in-focus operation by the Z stage. Also, if necessary, the spatial filter 62 and lens 65 are replaced in accordance with the dimension of the measurement area.

After correctly setting the measurement area, the spatial filter 62 is moved to the original position. In this state, light applied to and reflected from the measurement area of the surface of the sample 44 is received with the light detector 23.

The succeeding measurement operations are substantially the same as those with the previous embodiment.

Figure 8:
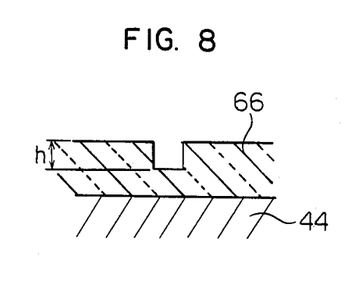
FIGS. 8 to 11 exemplify the configurations of other samples having level differences which can be measured according to the teachings of the present invention.
Figure 9:
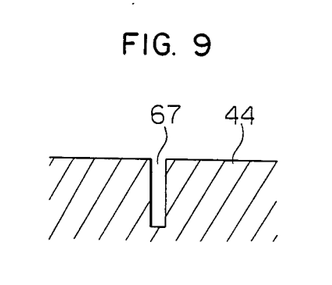
Figure 10:
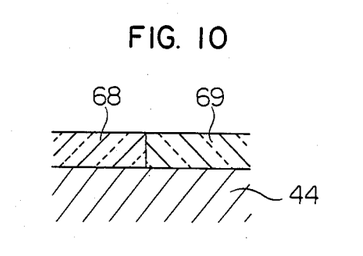
Figure 11:
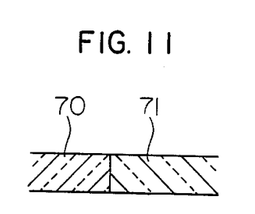

A sample to be measured is not limited to the sample as shown in FIG. 5, but other samples may also be used. For instance, a depth or level difference h in a transparent substance 66 formed on a sample 44 as shown in FIG. 8, a depth or level of hole 67 formed in a sample 44 as shown in FIG. 9, or a phase difference between two transparent substances 68 and 69 formed on a sample 44 as shown in FIG. 10 can be measured. Furthermore, if a sample is made of two transparent substances 70 and 71 as shown in FIG. 11, a phase difference can be measured without using the half-mirror 16 by applying light from the rear side of the sample.

According to the present invention, an imaging optical system is utilized when a level difference of a three-dimensional pattern formed on a substrate is measured on the basis of light interference method. Therefore, a non-contact measurement is possible for the level difference at a specific region having an area of about 0.2 to 3000 $\mu m^2$.

We claim:

1. A level difference measuring apparatus comprising:
    light source means for projecting coherent light onto a rugged portion of a sample, said light source means including wavelength varying means for varying a light wavelength $\lambda$ of the projected light and for providing a signal indicative of the light wavelength $\lambda$;
    a spatial filter, arranged at a position in an imaging relation with said light source, for shielding 0-order diffraction light of the light reflected from the rugged portion of the sample or diffraction light from the rugged portion of the sample other than the 0-order diffraction light;
    an imaging optical system for imaging the light image reflected from the rugged portion of the sample;
    detection means, having an opening for passing only the light image reflected from the rugged portion at a position where the imaging by said imaging optical system is effected, for detecting the intensity of the light passing said spatial filter and said opening and for providing a detection signal (I) indicative thereof; and
    arithmetic means for calculating the depth of the rugged portion of the sample from the detection signal (I) from the detection means and the signal indicative of the light wavelength $\lambda$ as varied by said wavelength varying means.

2. A level difference measuring apparatus according to claim 1, wherein said light source means includes a xenon lamp and a diffraction grating for spectroscopically dispersing light from said xenon lamp.

3. A level difference measuring apparatus according to claim 1, wherein said light source means includes a dye laser using a 2nd harmonic wave of one laser excitation source selected from a group consisting of He-Cd laser, $N_2$ laser, Ar laser and YAG laser.

4. A level difference measuring apparatus according to claim 1, wherein an illumination optical system for introducing the light from the light source means onto the sample includes an objective lens having an F value which is greater than 4.0 and the upper limit of which is determined by a sensitivity of said detection means.

5. A level difference measuring apparatus according to claim 1, further comprising a sample table for mounting the sample thereon and provided with an optical system for observing said sample, said optical system including a graduated plate in interlocking relation with said opening of said detection means.

6. A level difference measuring apparatus according to claim 5, wherein said graduated plate is provided with a mark of the same shape as that of the opening.

7. A level difference measuring apparatus according to claim 5, wherein said graduated plate is provided with a mark of a non-specified shape indicating a closed area.

8. A level difference measuring apparatus comprising:
   a light source means for projecting coherent light onto a rugged portion of a sample;
   a first spatial filter, arranged at a position in an imaging relation with said light source means, for shielding 0-order diffraction light of the light reflected from the rugged portion of the sample or diffraction light of the light reflected from the rugged portion of the sample other than the 0-order diffraction light;
   an imaging optical system for imaging the light image reflected from the rugged portion of the sample;
   detection means, having an opening for passing only the light image reflected from the rugged portion of the sample at a position where the imaging by said imaging optical system is effected, for detecting the intensity of the light passing said first spatial filter and said opening and for providing a detection signal (I) indicative thereof;
   wavelength varying means for varying a light wavelength $\lambda$ and for providing a signal indicative of the light wavelength $\lambda$, and
   arithmetic means for calculating the depth of the rugged portion of the sample from the detection signal (I) from the detection means and the signal indicative of light wavelength $\lambda$ as varied by said wavelength varying means.

9. A level difference measuring apparatus according to claim 8, further comprising a half mirror arranged so that the light emitted from said light source means is illuminated onto the rugged portion of the sample along an axis perpendicular to the rugged portion and the light image reflected from the rugged portion of the sample is imaged by said imaging optical system having a light axis along said perpendicular axis.

10. A level difference measuring apparatus according to claim 8, wherein said light source means directs the light to a spatial filter having an annular diaphragm shape.

11. A level difference measuring apparatus according to claim 8, wherein said light source means comprises a laser oscillator.

12. A level difference measuring apparatus according to claim 8, wherein said light source means emits substantially parallel light and said first spatial filter has a circular shape.

13. A level difference measuring apparatus according to claim 12, wherein said light wavelength varying means varies the light wavelength in the range of 250 nm to 800 nm.

14. A level difference measuring apparatus according to claim 8, wherein said wavelength varying means is provided in said light source means.

15. A level difference measuring apparatus according to claim 14, wherein said value of l is calculated either by fast Fourier transformation (FET) or maximum entropy method (MEM).

16. A level difference measuring apparatus according to claim 8, whwerein said arithmetic means calculates the depth h of the rugged portion from the relation of $h = \frac{1}{2}nl = \frac{1}{2}n(\lambda_{j+2}\lambda_j/\lambda_j - \lambda_{j+2})$ where $\lambda j$ and $\lambda_{j+2}$ represent the wavelengths providing peak values of the detected signal I, l is a distance between the peak values of the detected signal I, and n is a refraction index of light.

17. A level difference measuring apparatus according to claim 8, wherein said wavelength varying means selects any wavelength through a diffraction grating.

* * * * *